US011683660B2

(12) United States Patent
Zhang

(10) Patent No.: US 11,683,660 B2
(45) Date of Patent: Jun. 20, 2023

(54) METHOD, APPARATUS AND SYSTEM FOR DETERMINING A LOCATION OF A MOBILE DEVICE

(71) Applicant: HUAWEI TECHNOLOGIES CO., LTD., Shenzhen (CN)

(72) Inventor: Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/167,918

(22) Filed: Feb. 4, 2021

(65) Prior Publication Data
US 2021/0250732 A1 Aug. 12, 2021

Related U.S. Application Data

(60) Provisional application No. 62/971,102, filed on Feb. 6, 2020.

(51) Int. Cl.
H04W 4/029 (2018.01)
H04W 4/40 (2018.01)

(52) U.S. Cl.
CPC ............ H04W 4/029 (2018.02); H04W 4/40 (2018.02)

(58) Field of Classification Search
None
See application file for complete search history.

(56) References Cited

U.S. PATENT DOCUMENTS 9,646,496 B1   5/2017  Miller
2001/0034239 A1  10/2001  Yamato et al.
(Continued)

FOREIGN PATENT DOCUMENTS

CN  101239626 A  8/2008
CN  102098778 A  6/2011
(Continued)

OTHER PUBLICATIONS

3GPP TS 38.305, V15.4.0, 3rd Generation Partnership Project; Technical Specification Group Radio Access Network; NG Radio Access Network (NG-RAN); Stage 2 functional specification of User Equipment (UE) positioning in NG-RAN (Release 15), Jun. 2019, 72 pages.
(Continued)

Primary Examiner — Adolf Dsouza

(57) ABSTRACT

There is provided a method, apparatus and system for determining a location of a mobile device operatively coupled to a wireless network such that the mobile device can locally calculate its location information with high accuracy. The method includes receiving, by a mobile device from each of one or more transmission points, a respective location information message. The transmission points belong to a wireless network and each location message is sent via broadcast transport channel designated for transmission of location information. Each location information message contains an indication of geographic location of its corresponding transmission point. The method further includes determining, by the mobile device, a location of the mobile device based on content of the location information message. The apparatus and system perform any or all of operations of the above methods and features explicitly or implicitly described.

18 Claims, 7 Drawing Sheets

(56) References Cited

U.S. PATENT DOCUMENTS

| | | |
|---|---|---|
| 2002/0025824 A1 | 2/2002 | Lin |
| 2004/0198386 A1 | 10/2004 | Dupray |
| 2008/0064380 A1 | 3/2008 | Niemenmaa et al. |
| 2011/0060807 A1 | 3/2011 | Martin et al. |
| 2012/0154286 A1 | 6/2012 | Lim et al. |
| 2012/0315903 A1 | 12/2012 | Yoshimura et al. |
| 2015/0226577 A1 | 8/2015 | Le Grand et al. |
| 2016/0307442 A1 | 10/2016 | Relyea et al. |
| 2017/0371337 A1 | 12/2017 | Ramasamy |
| 2018/0262903 A1 | 9/2018 | Ryan et al. |
| 2019/0035280 A1 | 1/2019 | Kim et al. |
| 2019/0078897 A1 | 3/2019 | Sumizawa |
| 2019/0384293 A1 | 12/2019 | Yoo |
| 2020/0410260 A1 | 12/2020 | Choe |
| 2021/0018916 A1 | 1/2021 | Thakur |
| 2021/0160810 A1* | 5/2021 | Zhang ................ G01S 5/10 |
| 2021/0407290 A1 | 12/2021 | Oba |

FOREIGN PATENT DOCUMENTS

| | | |
|---|---|---|
| CN | 104244404 A | 12/2014 |
| CN | 104796865 A | 7/2015 |
| CN | 106646573 A | 5/2017 |
| CN | 107121980 A | 9/2017 |
| CN | 107222894 A | 9/2017 |
| CN | 109451580 A | 3/2019 |
| CN | 109813332 A | 5/2019 |
| CN | 109842934 A | 6/2019 |
| EP | 3190426 A1 | 7/2017 |
| EP | 3240311 A1 | 11/2017 |
| EP | 3352486 A1 | 7/2018 |
| JP | 2002518684 A | 6/2002 |
| JP | 2018197964 A | 12/2018 |
| KR | 20050017046 A | 2/2005 |
| WO | 2012099828 A1 | 7/2012 |
| WO | 2019027245 A1 | 2/2019 |

OTHER PUBLICATIONS

3GPP TS 23.273 V16.1 0, 3rd Generation Partnership Project; Technical Specification Group Services and System Aspects; 5G System (5GS) Location Services (LCS); Stage 2(Release 16), Sep. 2019, 90 pages.

\* cited by examiner

METHOD, APPARATUS AND SYSTEM FOR DETERMINING A LOCATION OF A MOBILE DEVICE

CROSS-REFERENCE TO RELATED APPLICATIONS

This application claims the benefit and priority from U.S. Provisional Patent Application No. 62/971,102 filed Feb. 6, 2020, the contents of which are incorporated herein by reference in their entirety.

FIELD OF THE INVENTION

The present invention pertains to the field of wireless communication and in particular to a method and apparatus for determining a location of a mobile device operatively coupled to a wireless network.

BACKGROUND

Techniques for location based services are important for supporting current and future mobile device applications. Indeed, many location-based wireless control and management services, such as location based user equipment (UE) operation optimization and location based resource management in vehicle-to-everything (V2X) systems, have been proposed. Techniques used for such location based services need control/management maps and also require location information being available at wireless network entities (e.g. devices, cell phones, access points).

Many network entities acquire location information through a global positioning system (GPS) or similar system. GPS systems use satellites to enable a GPS receiver to determine the location of the network entities. The location information is two-dimensional information indicative of absolute geographic location of the device, including latitude and longitude of the device. Unfortunately, there are several issues for GPS system. One of the issues is unavailability of GPS signal especially indoors or on streets in urban areas. Another issue is extensive power consumed in computing the location of the device. Moreover, the GPS system cannot distinguish devices situated on different floors of the same building due to lack of altitude information, because typically only two-dimensional position information is determined.

There are systems using alternative positioning techniques such as 3rd Generation Partnership Project (3GPP) positioning techniques and Wi-Fi based techniques. However, these techniques are more suitable for networks or access points, rather than devices themselves, when obtaining device location. In addition, while there are some systems enabling mobile devices to locally estimate their locations, accuracy for the locations estimated is far from the desired level. For example, accuracy of those systems is only cell or access point level of accuracy.

Therefore, there is a need for a method, apparatus and system for determining a location of a mobile device that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for determining a location of a mobile device. Location refers to geographic location. In various embodiments the approach may be efficient, reliable and ubiquitous such that the mobile device can obtain its location information locally with high accuracy. Such methods and apparatus, and systems would enable location based techniques to be applied for a variety of services such as smart city and industry 4.0. Embodiments of the present invention may enhance existing wireless access networks by having one or more transmission points provide their location information. This may enable wireless devices to locally estimate their location without developing a separate, dedicated infrastructure network for location information provision. The transmission points may be radio access nodes, such as NodeB, gNodeB, gNB or (e.g. cellular) base stations. Embodiments of the present invention may also provide a terrain positioning physical/logical channel in existing wireless networks to enable wireless devices to locally estimate their location without developing a separate, dedicated infrastructure network. According to embodiments, new message designs or formats may be used for network messages carrying location information.

In accordance with embodiments of the present invention, there is provided a method for implementation by one or more devices in a wireless communication network. The method includes receiving, by a mobile device from each one of one or more transmission points of a wireless network via a respective broadcast transport channel designated for transmission of location information, a respective location message. The respective location information message contains an indication of geographic location of said one of the one or more transmission points. The method further includes determining, by the mobile device, a location of the mobile device based on content of the location information message. The wireless communication network infrastructure is thus used for both communication and transmission of location information messages. A technical effect may be that the communication and location support infrastructure is combined. Efficiencies can be achieved due to such combination.

In some embodiments, the respective broadcast transport channel designated for transmission of location information is a dedicated logical channel of the wireless network or a dedicated physical channel associated with the dedicated logical channel. The wireless network may be further configured to facilitate general communication with the mobile device. Thus the location information functionality is closely integrated into the wireless communication system as a whole. In some embodiments, the respective broadcast transport channel designated for transmission of location information is a dedicated physical channel associated with a dedicated logical channel of the wireless network, and the location information message is transmitted on a portion of resources assigned to the dedicated physical channel. The portion of resources may be configured for a re-use by multiple ones of the transmission points. In some cases, the transmission points may be spaced apart sufficiently that mutual interference due to said re-use is below a level required for reliable reception of the location information message. This can reduce the burden on mobile devices by reducing the number of resources that need to be searched or monitored for location information messages.

In some embodiments where the respective broadcast transport channel designated for transmission of location information is a dedicated physical channel associated with a dedicated logical channel of the wireless network, the method further includes continuously or intermittently monitoring, by the mobile device, the dedicated physical channel for detecting the dedicated logical channel associated with dedicated physical channel. The mobile device may determine the location of the mobile device based on physical layer detection information of the dedicated physical channel. The physical layer detection information may be obtained from signals transmitted by three or more of the transmission points. Said signals may include the location information, other signals, or a combination thereof, and the physical layer detection information may include an indication of distance, direction, or both distance and direction of said three or more transmission points relative to the mobile device. The mobile device thus receives the location information messages in a similar manner to other channels of a conventional wireless communication system, and may determine its location based for example on triangulation or multilateration operations in a similar manner to satellite-based (e.g. GPS) positioning systems. This may allow for design and operation of the mobile device to be simplified, because certain reception operations pertaining to location information messages and other messages can be at least partially unified or integrated.

In some embodiments, said determining the location of the mobile device is performed based on physical layer parameters of the location information messages, physical layer parameters of other signals transmitted by one, two or more of the transmission points, or a combination thereof. The physical layer parameters of the signals can be also used for detection of the location information messages.

In some embodiments, the method further includes receiving, by the mobile device, a decryption key; and decrypting the location information message using a decryption key. The location message may be encrypted, and the decryption key may be transmitted to the mobile device, for example from a control function or from a transmission point if suitable security can be established. This allows the location information service to be provided separately to authorized mobile devices, which allows the service to be charged for separately.

In some embodiments, the method further comprises sending, by the mobile device, a registration message to one of the transmission points or a control function communicable with at least one of the transmission points. The method may further include, receiving, by the mobile device from the control function or said one of the transmission points, resource information. The resource information may indicate communication resources configured for a transmission of the location information messages between the one or more transmission points and the mobile device. The method may further include, monitoring, by the mobile device, said communication resources for the location information message. Thus, access to the location information is controlled and managed. This also allows for the location information service to be charged for and provided separately from other services. In some embodiments, the location information messages are encrypted, and the resource information may further include security information to be used by the mobile device for decrypting the location information messages. The security information may include a decryption key usable for decrypting the location information messages, or information used to generate or obtain such a decryption key.

In some embodiments, the respective location information message further contains an identifier of said one of the one or more transmission points. The indication of geographic location may be one of an absolute geographic location and a geographic location relative to a predetermined reference location. The absolute geographic location may comprise latitude, longitude and height information. The geographic location relative to a predetermined reference location may comprise a three-dimensional location offset from said reference location. Use of relative location can simplify location determinations. Three-dimensional location indications can allow for mobile devices to determine their locations in complex environments, e.g. in cities or buildings with multiple levels.

Embodiments of the present invention provide for apparatuses configured to perform operations corresponding to the methods described above and elsewhere herein. According to embodiments, there is provided a mobile device operatively coupled to a wireless network. The mobile device is configured to receive, from each one of one or more transmission points of a wireless network via a respective broadcast transport channel designated for transmission of location information, a respective location information message. The respective location information message contains an indication of geographic location of said one of the one or more transmission points. The mobile device is further configured to determine a location of the mobile device based on content of the location information message. The mobile device can further be configured to operate in accordance with embodiments which are described above with respect to the method.

Embodiments of the present invention provide for systems configured to perform operations corresponding to the methods described above and elsewhere herein. According to embodiments, there is provided a system including a plurality of transmission points of a wireless network and a mobile device. The transmission points are each configured to transmit a respective location information message containing an indication of geographic location of said one of the plurality of transmission points. The transmission points transmit the respective location information message via a respective broadcast transport channel designated for transmission of location information. The mobile device is operatively coupled to the wireless network and configured to: receive a plurality of the location information messages; and determine a location of the mobile device based on content of the plurality of the location information messages.

The system may further include a control function configured to: receive, from the mobile device, a registration message. The mobile device receives resource information from the control function or said one of the plurality of transmission points. The resource information indicates communication resources configured for a transmission of the location information messages between one or more transmission points and the mobile device. Based on the resource information, the mobile device monitors or configures itself to monitor the communication resources.

In some embodiments, the respective broadcast transport channel designated for transmission of location information is a dedicated logical channel of the wireless network or a dedicated physical channel associated with the dedicated logical channel. The wireless network may be further configured to facilitate general communication with the mobile device. The mobile device may be further configured to monitor the dedicated physical channel for detecting the dedicated logical channel associated with dedicated physical channel.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
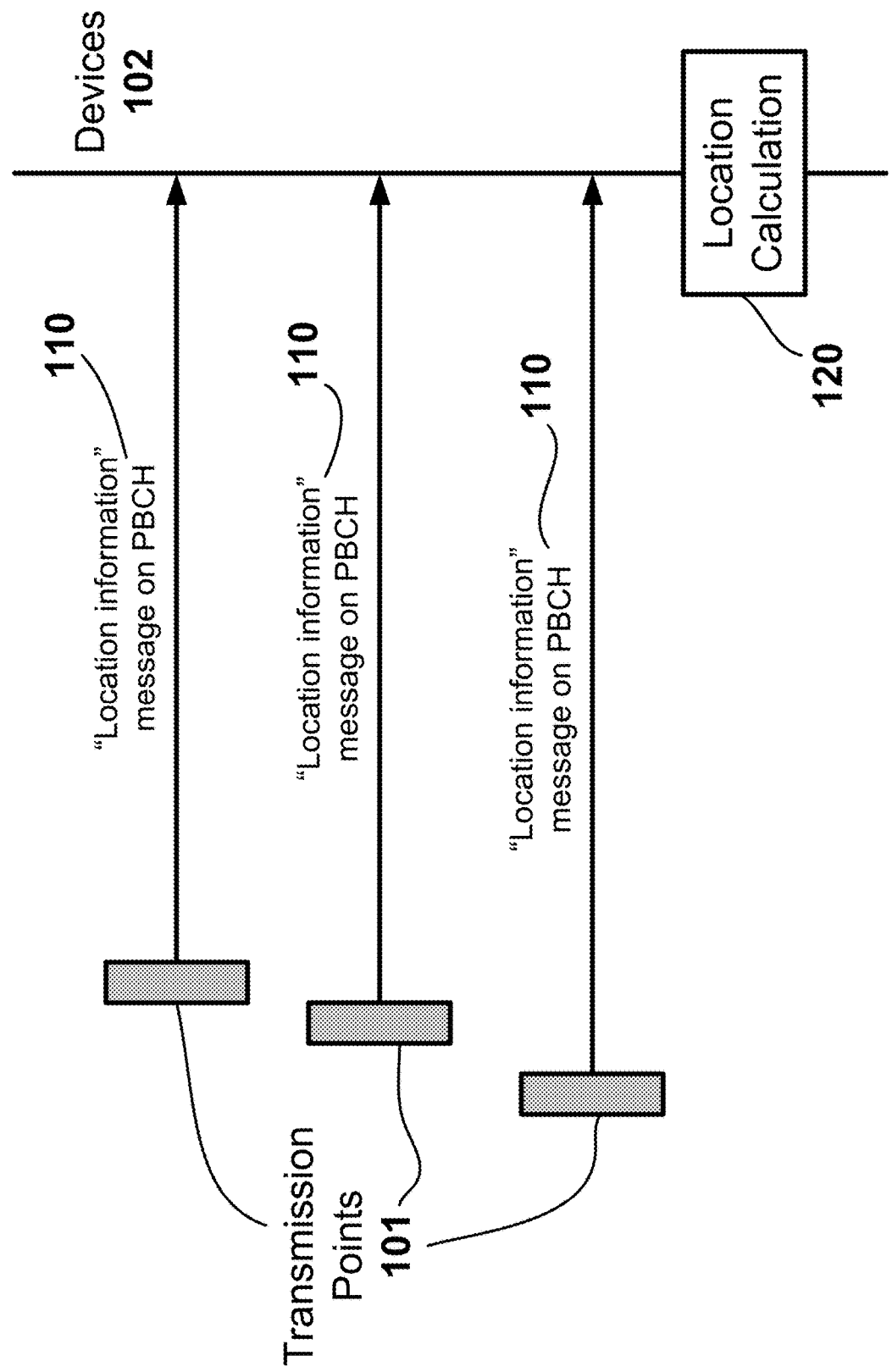
FIG. 1 illustrates an example procedure for local calculation of device location using location information of transmission points, in accordance with embodiments of the present invention.

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention provide a method and apparatus for providing wireless location information message for use by mobile devices in determining their locations. The mobile device is communicatively coupled to a wireless communication network, also referred to as a wireless network, and the mobile device uses transmission points of the wireless communication network for communication purposes. In addition, the transmission points wirelessly transmit location information message, which are used by the mobile device to determine their geographic location. Therefore, the same infrastructure can be also used for wireless communication services and location services. This results in a more efficient use of infrastructure, because the same infrastructure is used for multiple purposes. The transmission points denote the point of origin of transmitted wireless signals, e.g. co-located with a corresponding antenna. Accordingly, the same transmission points, and the same wireless network, facilitates both general communication with mobile devices and transmission of location information messages. The general communication may be general-purpose communication, for example including voice communication, data communication, or both.

The location information message transmitted by a given transmission point includes an indication of the geographic location of that transmission point. In addition, the location information message can include other relevant information such as a time stamp indicative of a precise time of transmission of the signal. Based at least in part on location information message received from multiple transmission points, the mobile device is configured to determine its location. Various techniques can be used for location determination, for example triangulation, trilateration, multilateration, time-of-arrival processing, time-difference-of-arrival processing, angle-of-arrival processing, etc. In some embodiments, a multilateration technique similar to that used in global positioning systems (GPS) can be used. Physical layer detection information can be used to facilitate these techniques. As will described below, the actual location determination can be based solely on the signals carrying the location information, or based on these signals in addition to other physical signals transmitted by the transmission point. Multilateration for example may comprise determining a precise time-of-flight of the location information message by determining the time of reception of the physical signal carrying the location information message, based on characteristics of the physical signal such as time-domain peaks or signatures in the modulated physical signal. Multilateration techniques similar to those used in GPS systems can be implemented, as would be readily understood by a worker skilled in the art.

In some embodiments, the location information message includes an indication of geographic location of one transmission point along with an associated transmission point identifier. Alternatively, the location information message includes an indication of geographic location of plural transmission points along with plural respective associated transmission point identifiers. Based on such location information message, the mobile device determines the locations of a set of transmission points within communication range. The mobile device can then determine its distance from these transmission points, or the direction toward these transmission points, or a combination thereof, by monitoring and processing signals transmitted by the transmission points. These signals can include the location information messages or other transmissions by the transmission points which are separate from the location information messages. For example, signals can be processed to determine the direction of origin, the time delay between transmission and reception (and thus the distance travelled), or both. This information can be used for triangulation or multilateration by the mobile device for location determination, based on the known locations of the transmission points transmitting the signals.

A variety of techniques can be used for transmitting the location information message. In some embodiments, the location information message is transmitted as location information message broadcasts via an existing, standardized (e.g. according to a $3^{rd}$ generation partnership project (3GPP)) broadcast transport channel. In some embodiments, the location information message are transmitted as part of a system information block (SIB) which is defined according to existing wireless communication standards, e.g. 3GPP standards such as LTE or 5G standards. In some embodiments, a dedicated positioning physical and logical channel can be used for transmitting the location information message. The dedicated positioning physical and logical channels are used solely for transmitting the location information message. In some embodiments, the broadcast transport channel may be defined, allocated or assigned for specific transmission of the location information message.

According to embodiments, location information of transmission points in wireless access networks may be transmitted to mobile devices to determine the location of the mobile devices. In some embodiments, a location information message may be broadcast via a broadcast transport channels. The broadcast transport channel may be customized or adjusted for transmission of location information message. The location information message may carry a list of location information. The list of location information may include one or more of: absolute location information (e.g. latitude, longitude, height); relative location information with respect to a fixed position or place, or other information indicative of geographic location of transmission points. Each instance of the location information may correspond to a transmission point identified by a corresponding transmission point identifier in the location information message. The list of location information may include location information for transmission points in a certain limited area. In some embodiments, a SIB may be configured to carry location information of the transmission point which transmits that SIB. The location information carried by the SIB may include one or more latitude, longitude and height information of the transmission points. The location information may include other information indicative of location of the transmission points. For instance, the location information may include information indicative of the location of the transmission point location in other format.

According to embodiments, location information of transmission points may be broadcast on one or more broadcast transport channels, for example a physical broadcast channel (PBCH). In some embodiments, a transmission point periodically broadcasts location information control message on one or more broadcast transport channels, for example PBCH. In some embodiments, an evolved Node B (eNodeB, or eNB) or other transmission point may broadcast its location information on one or more broadcast transport channels (e.g. PBCH) by including the location information in a SIB. The SIB may be an SIB defined according to prior or current iterations of a 3GPP wireless communication standard but adapted to include the location information. The SIB may be a new SIB not previously defined in 3GPP wireless communication standards. The location information carried by the SIB may be pre-configured by an operations, administration and maintenance (OAM) system.

According to embodiments, a mobile device may search for downlink (DL) cells and decode SIB messages in the course of normal operation. The mobile device may locally calculate its location based on available physical layer related detection information and corresponding location information of transmission points (e.g. three or more transmission points). Physical layer detection information may include aspects of physical layer signals, such as timing or directionality aspects, which can be used to facilitate location determination via triangulation or multilateration techniques, for example. Timing aspects can be used to determine the propagation (flight) time of the signals, which can then be used to determine the distance from signal transmitter to signal receiver. Directionality aspects can be used to determine the direction of the signal transmitter relative to the signal receiver. The physical layer detection information can therefore include an indication of distance, direction, or both distance and direction of said three or more transmission points relative to the mobile device.

FIG. 1 illustrates an example procedure 100 for local calculation of mobile device location using location information of transmission points, in accordance with embodiments of the present invention. The transmission points 101 and the mobile devices 102 are communicatively coupled to a wireless network, and the devices 102 may use the transmission points 101 to communicate with other network entities in the network. For that, the transmission points 101 and devices 102 may be communicatively coupled to each other. At step 110, the transmission points 101 may broadcast location information message to the devices 102 on one or more physical broadcast channels (PBCH). In some embodiments, the location information message may be broadcast periodically (or repeatedly, e.g. continuously or according to a schedule) by the transmission points 101. The location information message may include an identifier of the transmission points 101 and an indication of geographic location of the transmission points 101. In some embodiments, the location information may be carried by the SIB. For example, the location information may be transmitted on the PBCH. The location information may be pre-configured by an OAM system in the wireless network. In some embodiments, three or more transmission points 101 may broadcast location information message for reception by the devices 102.

While FIG. 1 only shows the location information message being broadcast on PBCH, those skilled in the art will appreciate that the location information message may be broadcast on other existing network channels and also appreciate that there may be one or more additional instances of the location information message broadcast on PBCH or other existing network channels. Furthermore, while FIG. 1 illustrates a plurality of the transmission points 101 transmit the location information message to the mobile devices 102, those skilled in the art will appreciate that the location information message may be transmitted from a single transmission point. In such cases, while being transmitted by a single transmission point, the location information message includes an indication of geographic location of multiple transmission points. The transmission point that transmits the location information message carrying location information for multiple access nodes may collect information indicative of geographic location of other transmission points, regularly (periodically) or whenever it needs to transmit the location information message. However, if the mobile device relies on triangulation or multilateration to determine its location, different transmission points should still transmit signals suitably configured for this purpose. The signals can be separate from the location information message.

When the location information message is transmitted to the mobile devices 102, the mobile devices 102, at step 120, may start calculating their location. The location calculation may be performed locally within a mobile device 102, without developing dedicated infrastructure network or communicating with other network entities (e.g. server) located remotely within the network. The location of the mobile device 102 may be calculated, at step 120, based at least partly on the location information message transmitted by the transmission points 101. Location calculation can be performed in a variety of ways as would be readily understood by a worker skilled in the art, for example using triangulation or multilateration.

According to embodiments, location messages may be broadcast by transmission points in the wireless network on one or more broadcast transport channels defined for (and dedicated to) transmission of location information. One of these channels may be referred to herein as the location broadcast physical channel or physical location broadcast channel (PLCH). The PLCH may be configured to use a dedicated set of resource units, e.g. selected from a predetermined, dedicated location information transmission (LIT) resource pool. Resource units may be defined in terms of one or more network resources, for example frequency bands, sub-carriers, time slots and codes, or a combination thereof. One resource unit in the LIT resource pool may be assigned to each transmission point. PLCH may be designed in a similar manner to the already 3GPP standardized PBCH, or another physical/logical synchronization channel. The size of the LIT resource pool may be determined such that the LIT resource pool can facilitate efficient positioning operation of devices while high accuracy in (device) positioning is facilitated. It may be noted that, in some cases, positioning operation is considered efficient when only small area needs to be searched. The LIT resource pool can be limited in size such that the mobile device does not have to search a large space of resource units to acquire and decode a message. Another channel defined for transmission of location information may be the positioning transport channel. This positioning transport channel may also be referred to as a location channel (LCH). The LCH may be used to convey the transmitters' location information message. In various embodiments, the newly defined channels such as PLCH and LCH may allow the mobile devices to obtain location information more effectively. For instance, the mobile device may detect the location message transmitted via PLCH and LCH more easily amongst other information broadcast from the transmission points.

Figure 2:
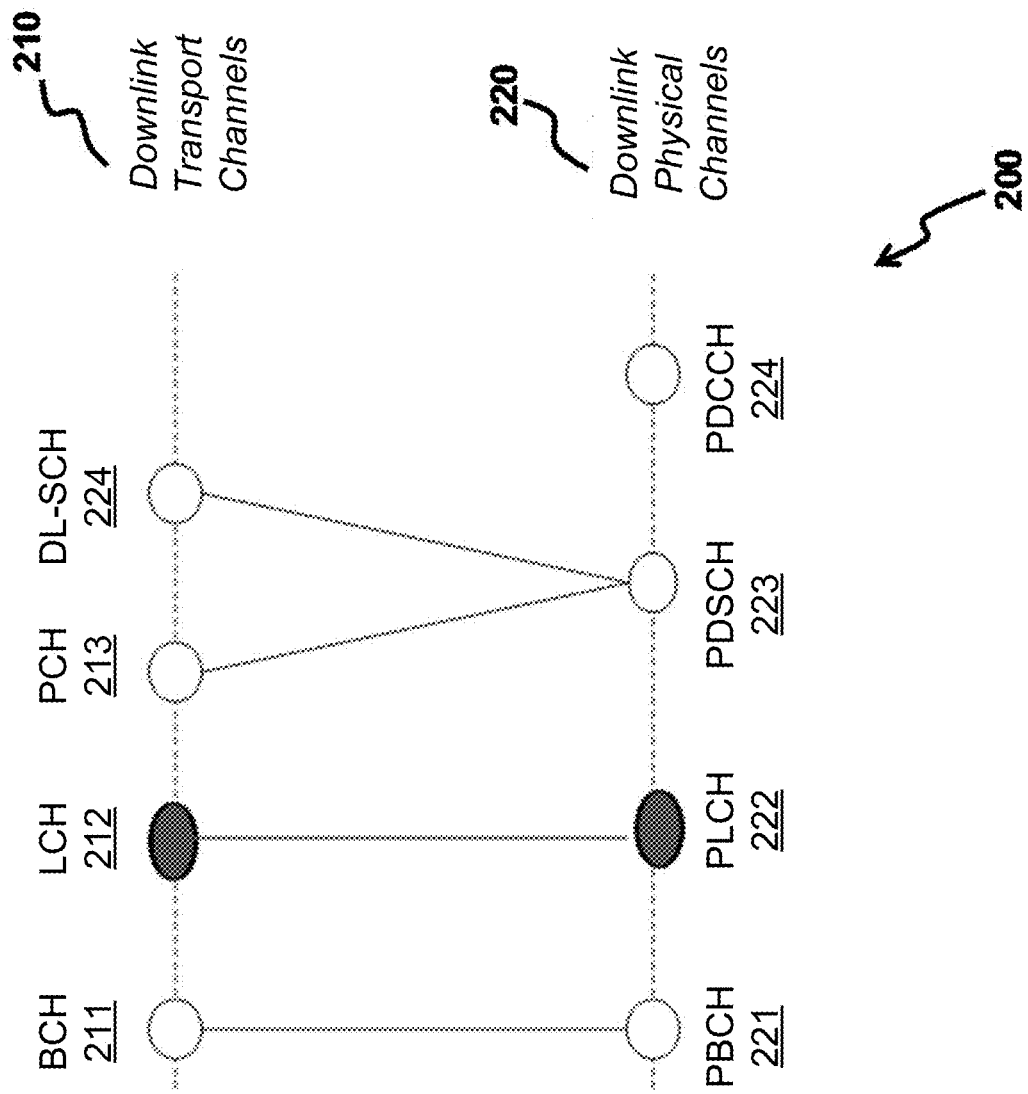
FIG. 2 illustrates an example of mapping between physical channels and transport channels in the wireless network, in accordance with embodiments of the present invention.

FIG. 2 illustrates an example of mapping between physical channels and transport channels in the wireless network, in accordance with embodiments of the present invention. Referring to FIG. 2, the wireless network 200 may comprises a set of data channels for data transmissions including the downlink transport channels 210 and the downlink physical channels 220. The downlink transport channels 210 may be transmission channels that carry user data and control messages and the downlink physical channels 220 may be channels that provide services for the Medium Access Control (MAC) layer within the wireless network protocol structure.

As will be readily understood by a worker skilled in the art, wireless communication systems such as 5G systems as defined by 3GPP can include multiple channels (e.g. data channels). Logical channels include control channels for transferring control plane data and traffic channels for transferring user plane data. Physical channels correspond to sets of resources (e.g. time-frequency resources) used for transmission of transport channels, with each transport channel being mapped to a corresponding physical channel. Transport channels provide for services, accessible to the MAC layer, for transmitting information in a particular manner with particular characteristics.

Referring to FIG. 2, the downlink transport channels 210 may comprise Broadcast Channel (BCH) 211, location channel LCH 212, Paging Channel (PCH) 213 and Downlink Shared Channel (DL-SCH) 214. While not shown in the drawing, those skilled in the art will appreciate that the downlink transport channels 210 may further comprise other downlink transport channels, for example Multicast Channel (MCH). The downlink physical channels 220 may comprise Physical Broadcast Channel (PBCH) 221, Physical Location Broadcast Channel (PLCH) 222, Physical Downlink Shared Channel (PDSCH) 223 and Physical Downlink Control Channel (PDCCH) 224. While not shown in the drawing, those skilled in the art will appreciate that the downlink physical channels 220 may further comprise other downlink physical channels, for example Physical Multicast Channel (PMCH), Physical Control Format Indicator Channel (PCFICH) and Physical Hybrid ARQ Indicator Channel (PHICH).

Further referring to FIG. 2, the BCH 211 may be communicatively connected to the PBCH 221. The BCH 211 may carry information used for Master Information Block (MIB) and send the MIB information in cooperation with the PBCH 221. The LCH 212 is communicatively connected to the PLCH 222. The LCH 212 may convey the transmitters' location information message and transmit the location information message in cooperation with the PLCH 222. The transmitters' location information message may include location information of transmission points. The PCH 213 and the DL-SCH 214 may be communicatively connected to the PDSCH 223. The PCH 213 and the DL-SCH 214 may be multiplexed into the PDSCH 223. The PCH 213 may carry and send paging information to the PDSCH 223 and the DL-SCH 214 may carry and send SIB information and user data to the PDSCH 223. Accordingly, the PLCH and LCH coexist with other channels, such as other 3GPP standardized physical and transport channels.

According to embodiments, transmission points may repeatedly, intermittently or substantially continuously transmit location information message using a selected one (or more) of the resource units in the LIT resource pool. The resource unit may be pre-configured by OAM system in the wireless network. According to embodiments, mobile devices may obtain the LIT resource pool information at network entry and registration to a location service. The mobile devices may continuously monitor and detect the PLCH in order to search for and detect LCH. The mobile devices may (locally) calculate their location based on available physical layer detection information of PLCH and corresponding location information message. The available physical layer detection information of PLCH and corresponding location information message may be retrieved from three or more transmission points.

In some embodiments, the mobile device may perform one or more of these tasks only intermittently, rather than substantially continuously, for the purpose of saving energy. The one or more tasks that may be performed intermittently by the mobile device may include monitoring and detecting PLCH and LCH, and calculating device location using information from transmission points. In some embodiments, the time interval between successive monitoring and detecting operations by the mobile device may be relatively long for the purpose of saving energy. In this case, if required, the mobile device can locally determine its own location in between receipt of location information signals, based for example on deadreckoning operations. The mobile device can additionally or alternatively store location information for various transmission points and calculate its location based on physical layer detection information received from the transmission points separately from the location information.

Figure 3:
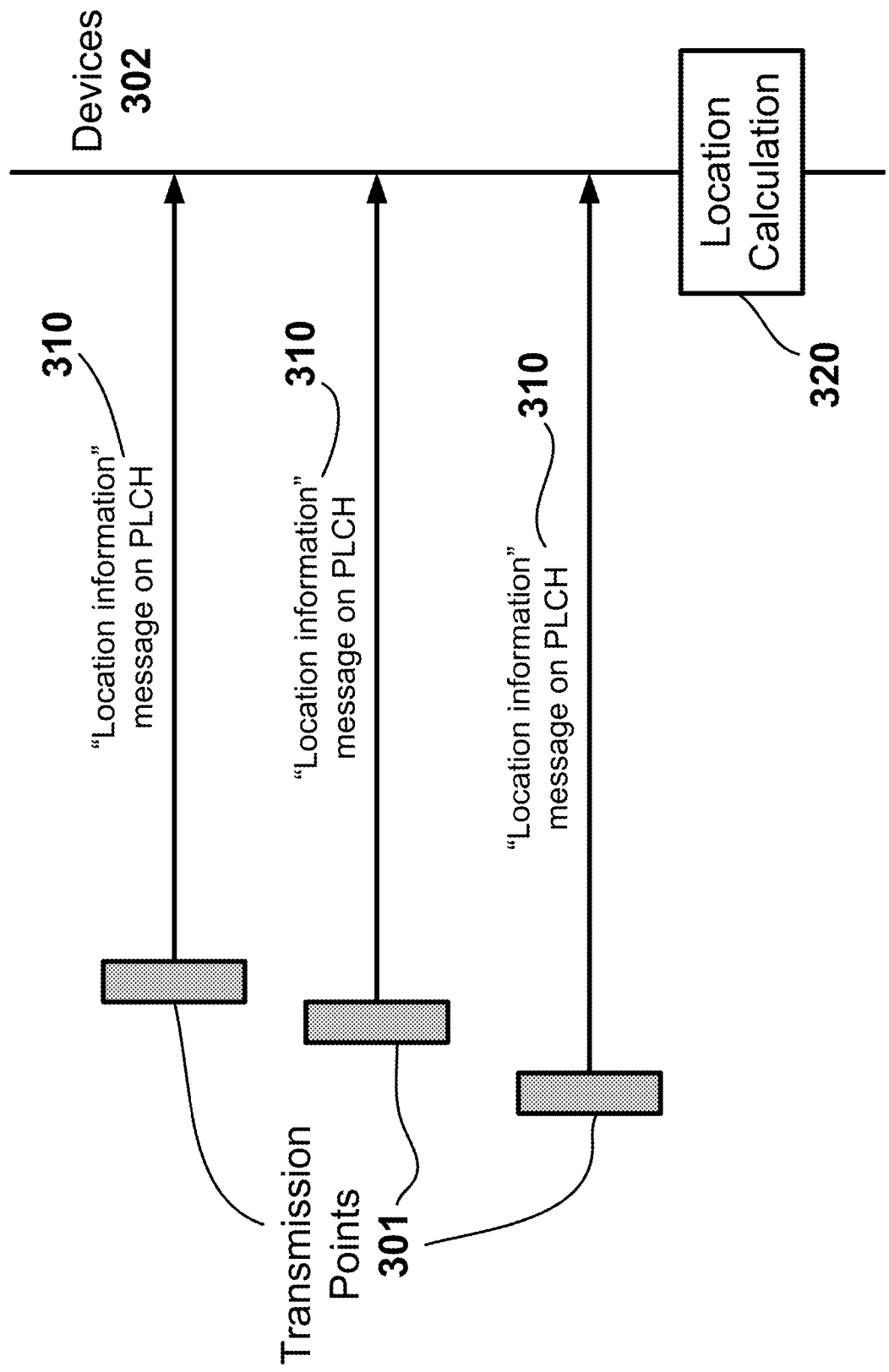
FIG. 3 illustrates an example procedure for local calculation of device location using location information of transmission points conveyed via physical location broadcast channel (PLCH), in accordance with embodiments of the present invention.

FIG. 3 illustrates an example procedure 300 for local calculation of device location using location information of transmission points conveyed via a physical location broadcast channel (PLCH), in accordance with embodiments of the present invention. The transmission points 301 and the devices 302 are communicatively coupled to a wireless network, and the devices 302 may use the transmission points 301 to communicate with other network entities in the network. For that, the transmission points 301 and devices 302 may be communicatively coupled to each other. At step 310, the transmission points 301 may broadcast location information message to the devices 302 on one or more physical location broadcast channels (PLCH). The location information message may include an identifier of the transmission points 301 and an indication of geographic location of the transmission points 301. In some embodiments, the location information message may be broadcast periodically by the transmission points 301. In some embodiments, the location information may be carried by the SIB. The location information may be pre-configured by an OAM system in the wireless network. In some embodiments, three or more transmission points 301 may broadcast location information message to the devices 302. While FIG. 3 only shows the location information message are broadcast on PLCH, those skilled in the art will appreciate that those location information message may be broadcast on other network channels designated for transport of location information and also appreciate that there may be one or more additional location information message broadcast on PLCH or other network channels designated for transport of location information. Furthermore, while FIG. 3 illustrates a plurality of the transmission points 301 transmit the location information message to the devices 302, those skilled in the art will appreciate that the location information message may be transmitted from a single transmission point. In such cases, while being transmitted by a single transmission point, the location information message includes an indication of geographic location of multiple transmission points. The transmission point that transmits the location information message carrying location information for multiple access nodes may collect information indicative of geographic location of other transmission points, regularly (periodically) or whenever it needs to transmit the location information message. The devices 302 are typically mobile devices. In some embodiments, the mobile devices are, or are incorporated into, vehicles which use location information for navigation purposes, such as self-navigation or providing navigation assistance to a driver.

When the location information message is transmitted to the devices 302, the devices 302, at step 320, may start calculating their location. The location calculation may be performed locally within the device 302, without developing dedicated infrastructure network or communicating with other network entities (e.g. server) located remotely within the network. The location of the device 302 may be calculated, at step 320, based at least partly on the location information message transmitted by the transmission points 301 via PLCH.

According to embodiments, there is provided a new message design or format for a network message comprising location information. In some embodiments, the location information message may be transmitted or broadcast on one or more broadcast transport channels (e.g. PBCH, PLCH). In such cases, the location information message may include an indication of type of location description and an indication of number of location records. The type of location description may indicate whether the location description type is absolute or relative, and in this case may occupy 1 bit of the message. For the number of location records, each location record may include ID of transmission point and location information. When the location description type is absolute, the location information may include latitude, longitude and height (altitude) of the transmission point. On the other hand, if the location description type is relative, the location information may include relative location of the transmission point. The relative location of the transmission point may be represented in terms of coordinates on an x, y and z axis, with some predetermined, commonly known origin or zero point.

In some embodiments, the location information message transmitted or broadcast on one or more broadcast transport channels (e.g. PBCH, PLCH) may be carried in a SIB. When the location information is carried in a SIB, the location information message may include type of location description, ID of transmission point and location information. The type of location description may be absolute or relative, as discussed above.

In some embodiments, the location information message may be transmitted or broadcast via network channels designated for transport of location information (e.g. PLCH, LCH). In such cases, the location information message may include type of location description, ID of transmission point and location information. The type of location description may be absolute or relative, as discussed above.

Figure 4:
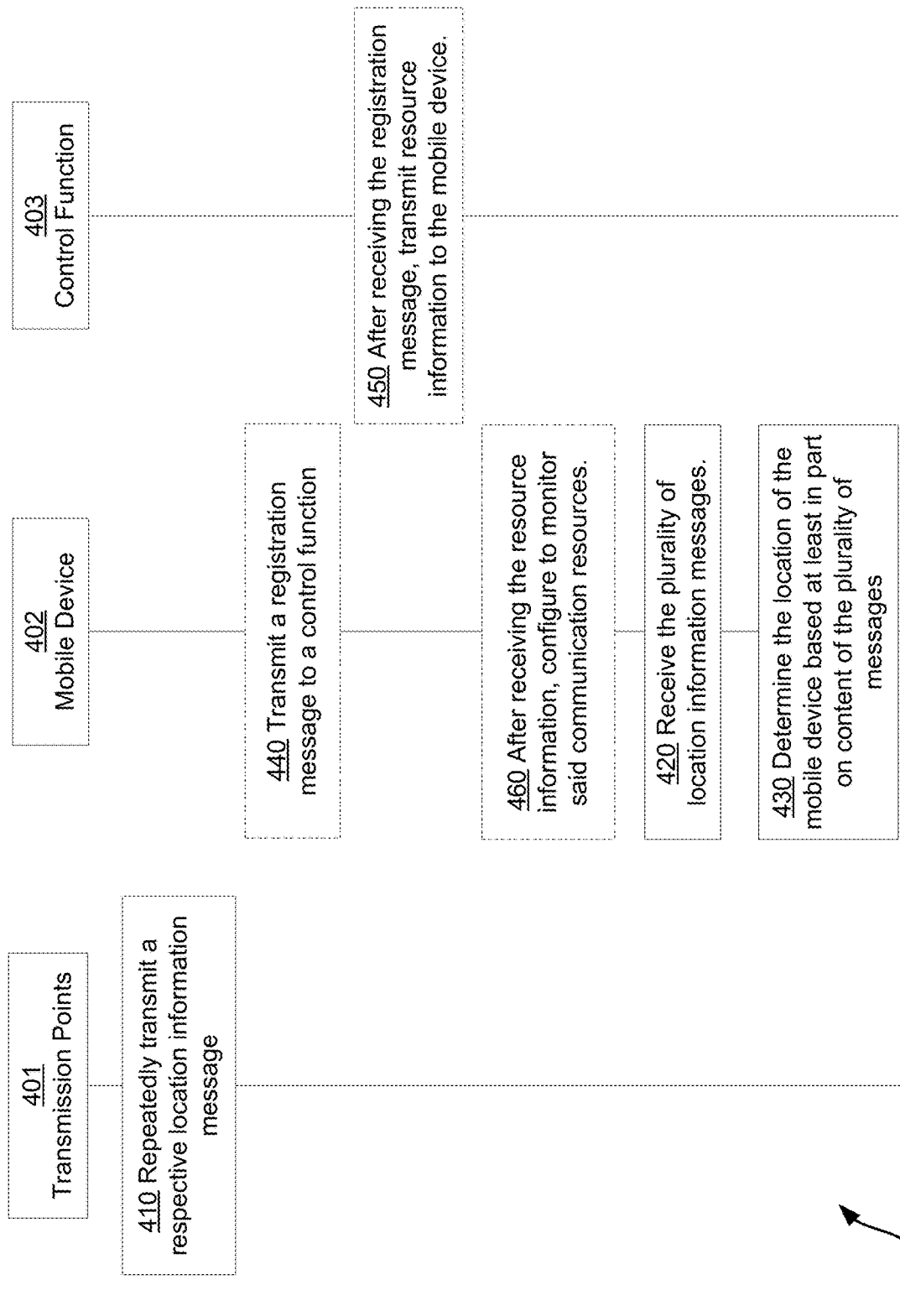
FIG. 4 illustrates a method for determining a location of a mobile device operatively coupled to a wireless network, in accordance with embodiments of the present invention.

FIG. 4 illustrates a method 400 for determining a location of a mobile device 402 operatively coupled to a wireless network, in accordance with embodiments of the present invention. Referring to FIG. 4, at step 410, one or more of a plurality of transmission points 401 of the wireless network may repeatedly transmit a respective location information message. Each of the location information messages may contain an indication of geographic location of said one or more of the plurality of transmission points. In some embodiments that transmit a location information message including an indication of geographic location of multiple transmission points 401, one of the transmission points 401 may collect information indicative of geographic location of other transmission points, regularly (periodically) or whenever it needs to transmit the location information message. In various embodiments, the location information message may include identifiers of the transmission points 401 and an indication of physical location of the transmission points 401. In various embodiments, the location information messages may be encrypted at each of the transmission points 401. The encryption of the location information message can be performed using a variety of suitable encryption algorithms, for example utilizing the concepts of public-key and symmetric-key, as would be readily understood by a worker skilled in the art. The encrypted location message can be decrypted at the mobile device 402, as is further described below. If suitable security can be established, the transmission points 401 may transmit to the mobile device 402 one or more decryption keys usable for decryption of the encrypted location information message. Alternatively a control function or other device may transmit (via wireless network) the one or more decryption keys in a secure manner for example upon authentication of the mobile device.

In some embodiments, the indication of physical location may be one of: an absolute physical location and a physical location relative to a predetermined reference location. The absolute physical location may comprise comprising latitude, longitude and height information. The physical location relative to a predetermined reference location may comprise a three-dimensional location offset from said reference location.

In some embodiments, the location information message may include a plurality of records. Each record may comprise an identifier of a different respective transmission point and an indication of physical location of said different respective transmission point.

At step 420, the mobile device 402 may receive the plurality of messages. The mobile device 402, at step 430, may determine its location based at least in part on content of the plurality of messages.

In some embodiments, the location information message may be a dedicated broadcast message transmitted via a respective broadcast transport channel. The broadcast transport channel may be defined according to a standard communication protocol of the transmission points 401. The broadcast transport channel may be also used by the transmission points 401 for other broadcasts. The location information message may be transmitted in a respective system information block (SIB) according to a standard communication protocol of the transmission points. The location of the mobile device 402 may be determined based on physical layer parameters of signals received from the plurality of transmission points. The physical layer parameters of the signals can be also used for detection of the location information messages.

In some embodiments, the location information message may be transmitted using a respective dedicated logical channel. The respective dedicated physical channel may be associated with the dedicated logical channel. Each of the transmission points may use a respective portion of wireless resources for transmitting respective ones of the location information message. The respective portion of wireless resources may be selected from a pool of wireless resources having limited size and may be dedicated to the physical channel. Also, ones of the transmission points within a predetermined proximity of one another may use different portions of the wireless resources, and at least two of the transmission points outside of the predetermined proximity of one another may use a same portion of the wireless resources.

In some embodiments where each of the transmission points uses a respective portion of wireless resources dedicated or assigned to the dedicated physical channel for transmitting respective location information message(s), the portion of (wireless) resources can be re-used by multiple ones of the transmission points. The multiple ones of the transmission points are spaced apart sufficiently that mutual interference due to said re-use is below a level required for reliable reception of the location information message(s). This approach is similar to frequency re-use, but generalized to other types of wireless resources, such as time slots, spreading codes, frequencies, resource blocks, or combinations thereof. A potential advantage of re-using resources is that mobile devices do not have to search or scan as many resources for signals from transmission points. This simplifies the signal acquisition process. Another potential advantage of re-using resources is that the pool of resources globally allocated to transmission points for transmitting location information messages can be limited and independent of geography, thereby simplifying wireless communication system design.

In some embodiments where the location information messages are encrypted at the transmission points 401, each of the encrypted location messages is decrypted at the mobile device 402. The decryption of the location information message can be performed using one or more suitable decryption techniques depending on the technique used for encryption of each location information message, as would be readily understood by a worker skilled in the art. In some embodiments, the mobile device 402 receives one or more decryption keys usable for decryption of the encrypted location information message. In some embodiments, all encrypted location messages can be decrypted using one shared public key. In some embodiments, each encrypted location message is decrypted using a respective unique private key.

Referring to FIG. 4, the method 400 may further includes optional steps 440, 450 and 460 for determining a location of a mobile device 402 operatively coupled to a wireless network. At step 440, the mobile device 402 may transmit a registration message to a control function 403 via the wireless network. The control function may be located at an access point of the wireless network or the control function may be located in a core portion of the wireless network and accessible via an access point. After receiving the registration message from the mobile device 402, at step 450, the control function 403 may transmit resource information to the mobile device 402. The resource information may be transmitted, as a response to the registration message transmitted at step 440, to the mobile device 402. The resource information may indicate communication resources used by the plurality of transmission points 401 to transmit the location information message. The resource information may indicate communication resources assigned for a transmission of a location information message between the mobile device and one or more transmission points. For example, the resource information may indicate which communication resources are expected to be used by one transmission point, or more than one transmission point, for communicating a location information message, or more than one location information message, the message being receivable by the mobile device.

After receiving the resource information from the control function, at step 460, the mobile device 402 may be configured to monitor said communication resources used by the plurality of transmission points 401, and assigned for transmission of one or more location information messages. In some embodiments, at step 460, the mobile device 402 may be self-configured to monitor said communication resources used by one or the plurality of transmission points. In various embodiments, each of a plurality of transmission points 401 may use a particular set communication resource. The location information message may be encrypted, and the resource information may further include security information to be used by the mobile device for decrypting the location information message.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations. Various electronics devices, such as computer devices, access point devices and core network devices, either virtualized or non-virtualized, can be used to implement transmission points or control functions. Electronic devices such as computers, smartphones, IoT devices, etc. can be configured as mobile devices operating as described herein.

Figure 5:
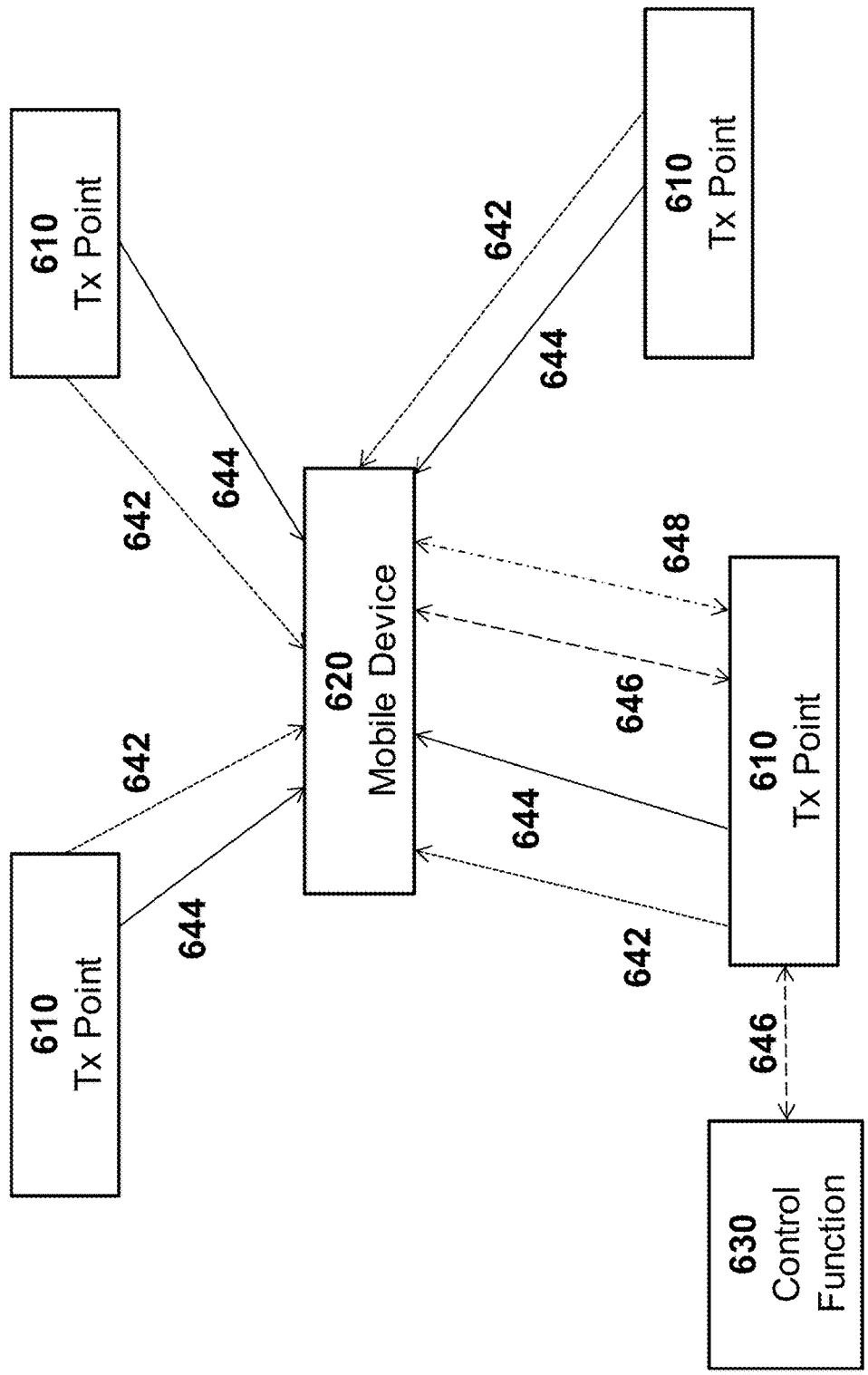
FIG. 5 illustrates a system and apparatus provided according to an embodiment of the present invention.

FIG. 5 illustrates a system 600 comprising a plurality of transmission points 610 of a wireless network, a mobile device 620 operatively coupled to the wireless network, and a control function 630 operatively coupled to the transmission points, for example residing in a core network. Each transmission points 610 is configured to repeatedly transmit a respective location information message 644, which contains an indication of geographic location of that transmission point. The mobile device 620 is configured to receive a plurality of the location information messages 644 from different transmission points 610. The mobile device 620 is further configured to determine, based at least in part on content of the plurality of the location information messages 644, the location of the mobile device.

In some embodiments, the transmission points 610 can also transmit additional signals 642, which can also be used by the mobile device 620 to determine its location. For example, the additional signals can be precisely timed or narrow beam signals which can be processed by the mobile device to determine distance or direction to each signal origin. The mobile device can then use triangulation or multilateration to determine its position relative to the signal origins. The mobile device can also use the location information to determine its actual position. The additional signals 642 can be separate from or integrated with the location information messages 644.

In various embodiments, the control function 630 is configured to interoperate with the transmission points and the mobile device 620. In particular, the mobile device 620 may transmit a registration message toward the control function 630 via communication path 646 and a transmission point 610. The registration message may include credentials and a request for location determination services using the signals 642 and location information messages 644. Following receipt of the registration message, and any necessary authentication or authorization, the control function is configured to transmit a response message via the path 646 and transmission point 610. The response message may include resource information indicating communication resources used by the transmission points 610 to transmit the location information messages 644. The response message may include resource information indicating communication resources assigned for a transmission of a location information message between the mobile device and one or more transmission points. Based on the resource information, the mobile device 620 configures itself to monitor the communication resources.

To reinforce that the transmission points 610 are also used for general-purpose wireless communication, it is shown that wireless communication signals 648 are transmitted between the mobile device 620 and at least one transmission point 610.

Figure 6:
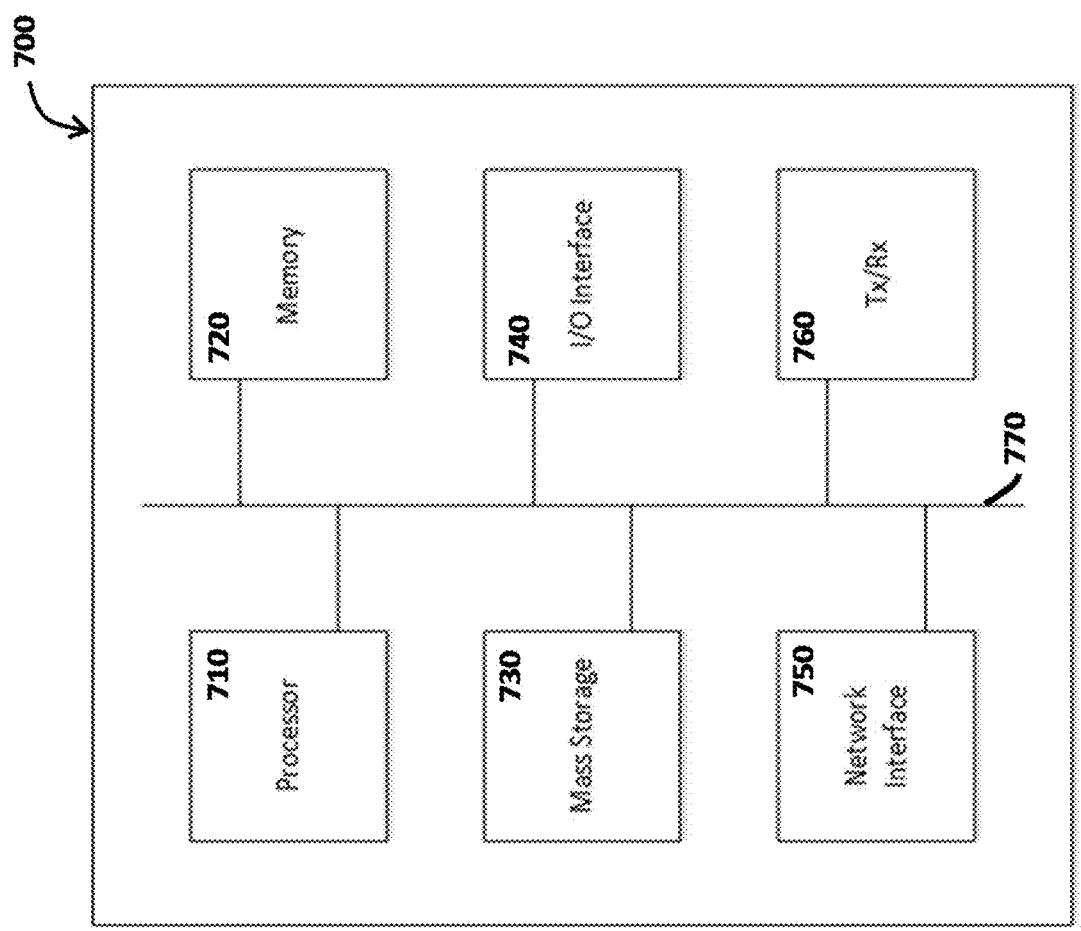
FIG. 6 illustrates, in a schematic diagram, an electronic device in accordance with embodiments of the present invention.

FIG. 6 is a schematic diagram of an electronic device 700 that may perform any or all of operations of the above methods and features explicitly or implicitly described herein, according to different embodiments of the present invention. For example, a computer equipped with network function may be configured as electronic device 700. The electronic device may be a mobile device or a device forming part of a transmission point, control function, or other device in a wireless communication access network or core network. The device may be part of a datacenter.

As shown, the device includes a processor 710, such as a Central Processing Unit (CPU) or specialized processors such as a Graphics Processing Unit (GPU) or other such processor unit, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the aforementioned method operations described above.

Figure 7:
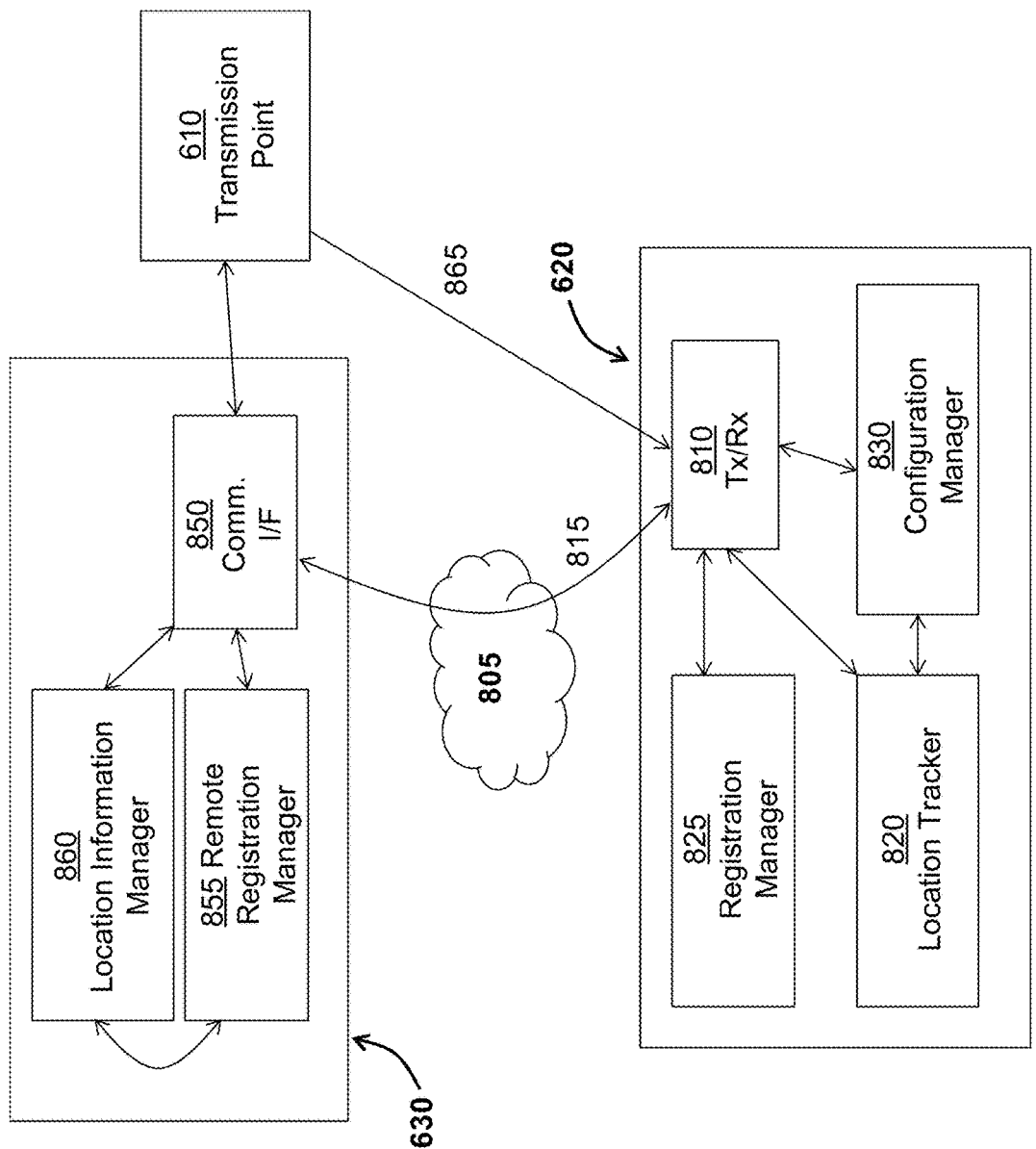
FIG. 7 illustrates a mobile device, control function and transmission point, in accordance with embodiments of the present invention.

FIG. 7 illustrates a transmission point 610, mobile device 620 and control function 630, in accordance with embodiments of the present invention. The control function 630 can be integrated with the transmission point 610, another transmission point, or it can be at a separate location in the network, for example at a datacenter. The transmission point 610 transmits signals 865 which can be used by the mobile device 620 to determine its position, for example using triangulation or multilateration. For this purpose, the mobile device may receive signals from multiple such transmission points (not shown). The mobile device includes a transmitter and receiver 810 which is usable to receive the signals 865, and also to communicate with the control function 630, for example via a network 805 which may at least partially include wireless communication links. The signals 865 are passed to the location tracker 820 of the mobile device and used to determine the mobile device location.

The control function 630, or a corresponding transmission point, transmits at least one location information message, for example via its communication interface 850 and communication channel 815. The location information message includes an indication of geographic location of one transmission point, or possibly of more than one transmission point. Each transmission point can transmit its own location information message, or one transmission point can transmit a location information message on behalf of multiple transmission points. The location information message includes an indication of geographic location of one or more transmission points. The location information messages are also passed to the location tracker 820 and used to determine the mobile device location. The signals 865 and the location information messages can be separate or integrated together. The location information messages can be managed at the control function 630 by a location information manager 860. The location information manager 860 tracks the locations of transmission point(s) for which it is responsible, and configures and triggers transmission of the corresponding location information messages. The location information manager 860 may also configure which communication resources are to be used to transmit the location information messages, and other parameters used in transmission of the location information messages. The location information manager 860 may similarly configure which communication resources and other parameters are to be used for transmitting the signals 865.

The mobile device 620 includes a registration manager, which transmits a registration message to a remote registration manager 855 of the control function 630. The registration message and its response are transmitted via the transmitter and receiver 810, network 805 and communication interface 850. In response to the registration message, the remote registration manager 855 transmits a response including resource information. The resource information indicates communication resources used by (and assigned for) one or more transmission points to transmit the location information messages, the signals 865, or both. This information is passed to a configuration manager 830 of the mobile device 620. The configuration manager 830 configures the mobile device to monitor (via the transmitter and receiver 810) the communication resources, indicated in the response, for location information messages, signals 865, or both. This may include configuring the mobile device to monitor certain frequencies, time slots, monitor for certain preambles or codes, etc. This allows the transmitter and receiver 810 to successfully receive the desired location information messages and signals 865 and pass these to the location tracker 820 for further processing.

As described above and elsewhere herein, embodiments of the present invention provide methods and apparatus, and systems for determining a location of a mobile device. Location refers to geographic location. In various embodiments the approach may be efficient, reliable and ubiquitous such that the mobile device can obtain its location information locally with high accuracy. Such methods and apparatus, and systems would enable location based techniques to be applied for a variety of services such as smart city and industry 4.0. Embodiments of the present invention may enhance existing a wireless access network by having one or more transmission points provide their location information. This may enable wireless devices to locally estimate their location without developing a separate, dedicated infrastructure network for location information provision. The transmission points may be radio access nodes, such as NodeB, gNodeB, gNB or (e.g. cellular) base stations. Embodiments of the present invention may also provide a terrain positioning physical/logical channel in existing wireless networks to enable wireless devices to locally estimate their location without developing a separate, dedicated infrastructure network. According to embodiments, new message designs or formats may be used for network messages carrying location information, as described above and elsewhere herein.

In accordance with embodiments of the present invention, there is provided a method for determining a location of a mobile device operatively coupled to a wireless network. The method comprises transmitting, from each one of one or more transmission points of the wireless network, a respective location information message. The respective location information message contains an indication of geographic location of said one of the one or more transmission points. The method also includes receiving, at the mobile device, the one or more location information messages and determining, based at least in part on content of the location information messages, the location of the mobile device.

In some embodiments, each of the location information messages is a dedicated broadcast message transmitted via a respective broadcast transport channel. The broadcast transport channel may be shared between the transmission points. The broadcast transport channel may be defined according to a standard communication protocol of the transmission points. The broadcast transport channel may also be used by the transmission points for other broadcasts. In some embodiments, each of the location information messages is transmitted in a respective system information block, for example defined according to a standard communication protocol of the transmission points. In some embodiments, the location of the mobile device may be determined based on physical layer parameters of signals received from the one or more transmission points.

In some embodiments, each of the location information messages is transmitted using a respective dedicated logical channel, a respective dedicated physical channel or both. The respective dedicated physical channel may be associated with the dedicated logical channel. Each of the transmission points may use a respective portion of wireless resources (assigned to the physical channel) for transmitting respective ones of the location information messages. The respective portion of wireless resources may be selected from a pool of wireless resources having limited size and may be dedicated to the physical channel. Also, ones of the transmission points within a predetermined proximity of one another may use different portions of the wireless resources, and at least two of the transmission points outside of the predetermined proximity of one another may use a same portion of the wireless resources. As used herein, the term "dedicated" refers to an entity which is used solely for the described purpose, and not for other purposes. Each location information message may occupy a portion of wireless resources assigned to a physical channel. Location information messages from different transmission points which are located within a predetermined area may occupy different portions of the wireless resources, and location information messages from different transmission points which are not located within a predetermined area (i.e. located outside of a predetermined area) may occupy a same portion of the wireless resources.

In some embodiments, the method further includes transmitting, by the mobile device, a registration message to a control function or one of the transmission points via the wireless network. The control function is communicable with at least one of the transmission points. The method may further include, following receipt of the registration message, transmitting, by the control function or said one of the transmission points, resource information to the mobile device. The resource information may indicate communication resources used by the one or more transmission points to transmit the location information messages. The method may further include, following receipt of the resource information, monitoring, by the mobile device, said communication resources. Different sets of communication resource may be assigned to different transmission points. In other words, each of the plurality of transmission points may use a particular set communication resource. The location information messages may be encrypted, and the resource information may further include security information to be used by the mobile device for decrypting the location information messages. The security information may include a decryption key usable for decrypting the location information messages, or information used to generate or obtain such a decryption key. Each of the location information messages may include an identifier of said one of the one or more transmission points.

In some embodiments, the indication of physical location may be one of: an absolute physical location and a physical location relative to a predetermined reference location. The absolute physical location may comprise comprising latitude, longitude and height information. The physical location relative to a predetermined reference location may comprise a three-dimensional location offset from said reference location.

In some embodiments, the location information message may include a plurality of records. Each record may comprise an identifier of a different respective one of the one or more transmission points and an indication of physical location of said different respective one of the one or more transmission points.

In accordance with embodiments of the present invention, there is provided a method for facilitating location determination of a mobile device operatively coupled to a wireless network. The method includes repeatedly transmitting, from a transmission point of the wireless network, a location information message. In various embodiments, the location information message may include an identifier of the transmission point and an indication of geographic location of the transmission point. In some embodiments, the indication of physical location may be one of: an absolute physical location and a physical location relative to a predetermined reference location. The absolute physical location may comprise comprising latitude, longitude and height information. The physical location relative to a predetermined reference location may comprise a three-dimensional location offset from said reference location. In some embodiments, the location information message may include a plurality of records. Each record may comprise an identifier of a different respective transmission point and an indication of physical location of said different respective transmission point.

Embodiments of the present invention provide for systems or apparatuses configured to perform operations corresponding to the methods described above and elsewhere herein. For example, in accordance with one embodiment, there is provided a system including a plurality of transmission points of a wireless network and a mobile device. Each of the transmission points is configured to repeatedly transmit a respective location information message containing an indication of geographic location of said one of the plurality of transmission points. The mobile device is operatively coupled to the wireless network and configured to: receive a plurality of the location information messages; and determine, based at least in part on content of the plurality of the location information messages, the location of the mobile device. The system may further include a control function configured to: receive, from the mobile device, a registration message; and following receipt of the registration message, transmit resource information to the mobile device, the resource information indicating communication resources assigned for a transmission of a location information message between one or more transmission points and the mobile device. Based on the resource information, the mobile device configures itself to monitor the communication resources.

In accordance with embodiments of the present invention, there is provided a mobile device operatively coupled to a wireless network. The mobile device is configured to transmit a registration message toward a control function. The mobile device is further configured to receive a response to the registration message, the response including resource information indicating communication resources assigned for a transmission of a location information message between the mobile device and one or more transmission points. Each respective location information message contains an indication of geographic location of one of the one or more transmission points transmitting said respective location information message. The mobile device is further configured to receive (at least some of) the location information messages including location information on the communication resources. The mobile device is further configured to determine, based at least in part on content of the received location information messages, the location of the mobile device. In some embodiments, the mobile device may be further configured to self-configure to monitor the communication resources for the location information messages.

In some embodiments, each of the location information messages is a dedicated broadcast message received via a respective broadcast transport channel. The broadcast transport channel may be shared between the transmission points. The broadcast transport channel may be defined according to a standard communication protocol of the transmission points. The broadcast transport channel may also be used by the transmission points for other broadcasts. In some embodiments, each of the location information messages is received in a respective system information block, for example defined according to a standard communication protocol of the transmission points. In some embodiments, the mobile device is further configured to determine the location of the mobile device based on physical layer parameters of signals received from the one or more transmission points.

In some embodiments, each of the location information messages is received over a respective dedicated logical channel, a respective dedicated physical channel or both. The respective dedicated physical channel may be associated with the dedicated logical channel.

In some embodiments, the location information messages may be encrypted, and the resource information may further include security information. The mobile device may be configured to use the security information to decrypt the location information messages. The security information may include a decryption key usable for decrypting the location information messages, or information used to generate or obtain such a decryption key. Each of the location information messages may include an identifier of said one of the one or more transmission points.

In some embodiments, the indication of physical location may be one of: an absolute physical location and a physical location relative to a predetermined reference location. The absolute physical location may comprise comprising latitude, longitude and height information. The physical location relative to a predetermined reference location may comprise a three-dimensional location offset from said reference location.

In some embodiments, the location information message may include a plurality of records. Each record may comprise an identifier of a different respective one of the one or more transmission points and an indication of physical location of said different respective one of the one or more transmission points.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   receiving, by a mobile device from each one of one or more transmission points of a wireless network via a respective broadcast transport channel dedicated for transmission of location information, a broadcasted respective location information message containing an indication of geographic location of said one of the one or more transmission points and broadcasted repeatedly according to a schedule; and
   determining, by the mobile device, its location based on content of the broadcasted location information message,
   wherein the respective broadcast transport channel dedicated for transmission of location information is a dedicated physical channel associated with a dedicated logical channel of the wireless network, and wherein the broadcasted location information message is transmitted on a portion of resources assigned to the dedicated physical channel, and
   wherein the portion of resources is configured for a reuse by multiple ones of the transmission points, and wherein the transmission points are spaced apart such that mutual interference due to said reuse is below a level required for reliable reception of the broadcasted location information messages.

2. The method of claim 1, further comprising:
   continuously or intermittently monitoring, by the mobile device, the dedicated physical channel for detecting the dedicated logical channel associated with dedicated physical channel.

3. The method of claim 2, wherein the mobile device determines its location based on physical layer detection information of the dedicated physical channel, the physical layer detection information obtained from signals transmitted by three or more of the transmission points, said signals including the location information, other signals, or a combination thereof, the physical layer detection information including an indication of distance, direction, or both distance and direction of said three or more transmission points relative to the mobile device.

4. The method of claim 1, wherein said determining the location of the mobile device is performed based on physical layer parameters of the broadcasted location information message, physical layer parameters of other signals transmitted by the one or more transmission points, or a combination thereof.

5. The method of claim 1, wherein the respective broadcasted location information message further includes an identifier of said one of the one or more transmission points, and wherein the indication of geographic location is one of: an absolute geographic location comprising latitude, longitude and height information, and a geographic location relative to a predetermined reference location and comprising a three-dimensional location offset from said reference location.

6. A method comprising:
   sending, by a mobile device, a registration message to one of one or more transmission points of a wireless network, or a control function communicable with at least one of the one or more transmission points;
   receiving, by the mobile device from the control function or said one of the one or more transmission points, resource information, the resource information indicating communication resources, of the wireless network, configured for a transmission of a broadcasted location information message between the one or more transmission points and the mobile device;
   monitoring, by the mobile device, said communication resources for the broadcasted location information message;
   receiving, by the mobile device from each one of the one or more transmission points via a respective broadcast transport channel dedicated for transmission of location information, a respective instance of the broadcasted location information message containing an indication of geographic location of said one of the one or more transmission points and broadcasted repeatedly according to a schedule; and
   determining, by the mobile device, its location based on content of the broadcasted location information message.

7. The method of claim 6, wherein the broadcasted location information messages are encrypted, and wherein the resource information further comprises security information to be used by the mobile device for decrypting the encrypted location information messages.

8. The method of claim 6, wherein the respective broadcast transport channel dedicated for transmission of location information is a dedicated physical channel associated with a dedicated logical channel of the wireless network, the method further comprising:

continuously or intermittently monitoring, by the mobile device, the dedicated physical channel for detecting the dedicated logical channel associated with dedicated physical channel.

9. The method of claim 8, wherein the mobile device determines its location based on physical layer detection information of the dedicated physical channel, the physical layer detection information obtained from signals transmitted by three or more of the transmission points, said signals including the location information, other signals, or a combination thereof, the physical layer detection information including an indication of distance, direction, or both distance and direction of said three or more transmission points relative to the mobile device.

10. The method of claim 6, wherein said determining the location of the mobile device is performed based on physical layer parameters of the broadcasted location information message, physical layer parameters of other signals transmitted by the one or more transmission points, or a combination thereof.

11. The method of claim 6, wherein the broadcasted location information message further includes an identifier of said one of the one or more transmission points, and wherein the indication of geographic location is one of: an absolute geographic location comprising latitude, longitude and height information, and a geographic location relative to a predetermined reference location and comprising a three-dimensional location offset from said reference location.

12. An apparatus comprising:
a processor;
a machine readable memory including machine readable instructions, the machine readable instructions, when executed by the processor cause the apparatus to:
receive, from each one of one or more transmission points of a wireless network via a respective broadcast transport channel dedicated for transmission of location information, a broadcasted respective location information message containing an indication of geographic location of said one of the one or more transmission points and broadcasted repeatedly according to a schedule; and
determine a location of the apparatus based on content of the broadcasted location information message,
wherein the respective broadcast transport channel dedicated for transmission of location information is a dedicated physical channel associated with a dedicated logical channel of the wireless network, and wherein the broadcasted location information message is transmitted on a portion of resources assigned to the dedicated physical channel, and
wherein the portion of resources is configured for a reuse by multiple ones of the transmission points, and wherein the transmission points are spaced apart such that mutual interference due to said reuse is below a level required for reliable reception of the broadcasted location information messages.

13. The apparatus of claim 12, wherein the machine readable memory when executed by the processor further configure the apparatus to continuously or intermittently monitor the dedicated physical channel for detecting the dedicated logical channel associated with dedicated physical channel.

14. The apparatus of claim 13, wherein the apparatus determines its location based on physical layer detection information of the dedicated physical channel, the physical layer detection information obtained from signals transmitted by three or more of the transmission points, said signals including the location information, other signals, or a combination thereof, the physical layer detection information including an indication of distance, direction, or both distance and direction of said three or more transmission points relative to the apparatus.

15. The apparatus of claim 12, wherein the apparatus is configured to perform said determining its location based on physical layer parameters of the broadcasted location information message, physical layer parameters of other signals transmitted by the one or more transmission points, or a combination thereof.

16. The apparatus of claim 12, wherein the machine readable memory when executed by the processor further configure the apparatus to: receive a decryption key; and decrypt the broadcasted location information message using the decryption key.

17. The apparatus of claim 12, wherein the broadcasted location information message further includes an identifier of said one of the one or more transmission points, and wherein the indication of geographic location is one of: an absolute geographic location comprising latitude, longitude and height information, and a geographic location relative to a predetermined reference location and comprising a three-dimensional location offset from said reference location.

18. A non-transitory processor-readable medium storing instructions, when executed by one or more processors of a mobile device, cause the one or more processors to perform a method comprising:
receiving, from each one of one or more transmission points of a wireless network via a respective broadcast transport channel dedicated for transmission of location information, a broadcasted respective location information message containing an indication of geographic location of said one of the one or more transmission points and broadcasted repeatedly according to a schedule; and
determining a location of the mobile device based on content of the broadcasted location information message,
wherein the respective broadcast transport channel dedicated for transmission of location information is a dedicated physical channel associated with a dedicated logical channel of the wireless network, and wherein the broadcasted location information message is transmitted on a portion of resources assigned to the dedicated physical channel, and
wherein the portion of resources is configured for a reuse by multiple ones of the transmission points, and wherein the transmission points are spaced apart such that mutual interference due to said reuse is below a level required for reliable reception of the broadcasted location information messages.

* * * * *